US009106559B2

(12) United States Patent
McLean et al.

(10) Patent No.: US 9,106,559 B2
(45) Date of Patent: Aug. 11, 2015

(54) SYSTEMS AND METHODS FOR AUTOMATICALLY SELECTING A COMMUNICATION CHANNEL

(71) Applicants: Ingo McLean, Valrico, FL (US); Mehrgan Mostowfi, Tampa, FL (US); Kenneth Jussi Christensen, Tampa, FL (US)

(72) Inventors: Ingo McLean, Valrico, FL (US); Mehrgan Mostowfi, Tampa, FL (US); Kenneth Jussi Christensen, Tampa, FL (US)

(73) Assignee: University of South Florida, Tampa, FL (US)

( * ) Notice: Subject to any disclaimer, the term of this patent is extended or adjusted under 35 U.S.C. 154(b) by 179 days.

(21) Appl. No.: 13/742,811

(22) Filed: Jan. 16, 2013

(65) Prior Publication Data
US 2013/0182575 A1 Jul. 18, 2013

Related U.S. Application Data

(60) Provisional application No. 61/586,927, filed on Jan. 16, 2012.

(51) Int. Cl.
*H04L 12/803* (2013.01)
*H04L 12/54* (2013.01)

(52) U.S. Cl.
CPC .......... *H04L 47/122* (2013.01); *H04L 12/5692* (2013.01)

(58) Field of Classification Search
USPC ......... 370/230, 235, 329, 252, 338, 229, 328, 370/225, 230.1, 237, 330, 400; 455/453, 455/509
See application file for complete search history.

(56) References Cited

U.S. PATENT DOCUMENTS 6,785,291 B1 * 8/2004 Cao et al. .................. 370/431
2006/0240858 A1 * 10/2006 Yamazaki et al. ............ 455/522
2007/0261082 A1 * 11/2007 Ji et al. ....................... 725/62

OTHER PUBLICATIONS

3GPP TS 23.107 version 4.1.0 Release 4 (Universal Mobile Telecommunications System (UMTS); QoS Concept and Architecture, 3GPP, Jun. 2001, §6.4.4.1, p. 20.*
Wang et al., Combining Subjective and Objective QoS Factors for Personalized Web Service Selection, Expert Systems with Applications 32 (2007), Feb. 2007, pp. 571-584.*
Raj et al., Web Service Selection Based on QoS Constraints, Trendz in Information Sciences & Computing (TISC), IEEE, Dec. 19, 2010, p. 156-162.*
McLean, et al. "Reducing Energy Use: A Dual Channel Link", IEEE Communications Letters, 2011.
A. Odlyzko, "Data networks are lightly utilized, and will stay that way," Review of Network Economics, vol. 2, No. 3, pp. 210-2137, 2003.

(Continued)

*Primary Examiner* — Benjamin H Elliott, IV
*Assistant Examiner* — Eric Nowlin
(74) *Attorney, Agent, or Firm* — Thomas | Horstemeyer, LLP

(57) ABSTRACT

In one embodiment, automatically selecting a local communication channel for downloading a block of data via a network includes downloading portions of the block of data using first and second communication channels, determining a bottleneck exists on one of the local communication channels or on a component upstream from the channels, in response to determining the bottleneck exists on one of the local communication channels, selecting the communication channel that has the lowest energy cost and a download speed that meets a minimum threshold, and in response to determining the bottleneck exists upstream from the local communication channels, selecting the local communication channel having the lowest energy cost.

14 Claims, 7 Drawing Sheets

(56) References Cited

OTHER PUBLICATIONS

P. Le Nguyen, et al. A Performance Evaluation of Energy Efficient Schemes for Green Office Networks, in Proc. 2010 IEEE Green Technologies conference, pp. 1-9.

Fukuda, et al. "Performance Evaluation of Power Saving Scheme with Dynamic Transmission Capacity Control", in Proc. IEEE Globecom Workshops, pp. 1-5.

T. Pering, et al. "CoolSpots: Reducing the Power of Consumption of Wireless Mobile devices with Multiple Radio Interfaces," Proceedings of ACM MobiSys, pp. 220-232, Jun. 2006.

GreenTouch, 2011, URL: http://www.greentouch.org.

SMART 2020: Enabling the Low Carbon Economy in the Information Age, A report by The Climate Group on behalf of the Global eSustainability Initiative (GeSI), 2008.

A. Odlyzko, "Internet Traffic Growth: Sources and Implications", Proceedings of SPIE, vol. 5247, pp. 1-5, 2003.

Remarks by the Honorable Ray Mabus, Secretary of the Navy, Naval Energy Forum, Hilton McLean Tysons Corner, McLean, VA, Wednesday, Oct. 14, 2009.

Christensen, et al. The Road to Energy Efficient Ethernet:, Energy Efficiency in Communications, IEEE Communications Magazine, Nov. 2010.

Chun, et al., "An Energy Case for Hybrid Datacenters", HotPower '09, Oct. 10, 2009.

Gunaratne, et al., "Reducing the Energy Consumption of Ethernet with Adaptive Link Rate (ALR)", IEEE Transcations on Computers, vol. 57, No. 4, Apr. 2008.

Nguyen, et al. "A performance evaluation of energy efficient schemes for green office networks," In Proc. 2010 IEEE Green Technologies conference.

* cited by examiner

SYSTEMS AND METHODS FOR AUTOMATICALLY SELECTING A COMMUNICATION CHANNEL

CROSS-REFERENCE TO RELATED APPLICATION

This application claims priority to U.S. Provisional Application Ser. No. 61/586,927, filed Jan. 16, 2012, which is hereby incorporated by reference herein in its entirety.

BACKGROUND

The energy consumed by information and communications technology (ICT) is of growing concern. High energy use has a negative environmental impact and can greatly increase operational expenses. Along with the rapid increase in data rates and energy use within ICT, there has been a corresponding increase in the number of available communication channels. For example, it is now typical for a user to have simultaneous access to the Internet via both Wi-Fi and Ethernet. Although Wi-Fi, which often consumes less power, is adequate for most communications tasks, it may be deemed too slow in other cases, for instance when a large file is to be downloaded. In such cases, high-speed Ethernet, which normally consumes greater power, may be considered necessary. Accordingly, selection of the channel with the lowest power consumption is not always the best choice and energy cost must be balanced with download time.

The competing desires of lower power consumption and acceptable data transfer rates motivate automatic channel selection to balance energy cost with response time. Although various solutions have been developed to select the local communication channel having the lowest energy consumption or the highest bandwidth, none have been developed that evaluate the communication path from end-to-end so as to take into account data transfer delays of the network or the data source. Accordingly, situations can arise in which high-speed Ethernet is selected over Wi-Fi, even when the data would be received just as quickly using the lower energy consuming Wi-Fi because of a non-local bottleneck.

In view of the above discussion, it can be appreciated that it would be desirable to have a system and method for automatically selecting a communication channel that consider not only local energy consumption and bandwidth but also data transfer rates from one end of the communication path to the other.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a system and method for automatically selecting a communication channel that considers not only local energy consumption and bandwidth but also data transfer rates from one end of the communication path to the other. Examples of such systems and methods are disclosed herein. In some embodiments, portions of a block of data, such as a file, that is to be downloaded are received over each of two different local communication channels and the system automatically determines which channel to use for the remainder of the download based upon the data transfer rate, the local energy cost, and the data transfer time of each channel. The channel that is selected is the lowest-cost channel that still satisfies a performance threshold.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
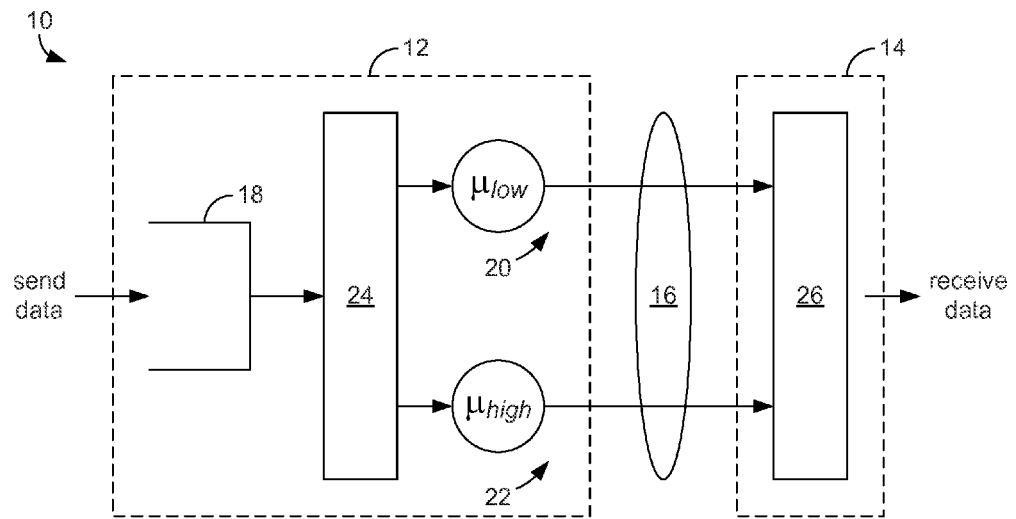
FIG. 1 is a block diagram of an embodiment of a dual-channel, single link (DCSL) system.

The automated communication channel selection described herein can be described as dual-channel, single link (DCSL) solution. FIG. 1 shows a high-level model 10 of DCSL operation. The model 10 includes a data sender 12 and a data receiver 14 that are coupled with a dual channel link 16. Data to be sent by the sender 12 is collected in a data buffer 18 and is split into a low-speed channel 20 having a data rate of $\mu_{low}$, and a high-speed channel 22 having a data rate of $\mu_{high}$. Packet ordering is maintained through a splitter 24 of the sender 12 and a joiner 26 of the receiver 14. The basic idea of DCSL is to use the low-speed/low-power channel whenever possible and to use the high-speed/high-power channel only when needed. In some embodiments, it is assumed that the low-speed channel 20 does not require wake and sleep transitions but the high-speed channel 22 does. The high-speed channel 22 is assumed to sleep during periods of low utilization and therefore achieves energy savings as compared to having only a single high-speed channel. Energy savings with DCSL are a function of the expected power use of each channel, the wake/sleep transition times of the high-speed channel, and network traffic.

DCSL can be implemented at the application layer when a client host application opens sockets on two different channels, each channel having a unique IP address. The application then determines the channel through which to send or receive data based on energy cost and performance requirements. Packet ordering is maintained on a connection-by-connection basis, where one channel could be Wi-Fi while the second could be high-speed Ethernet.

Figure 2:
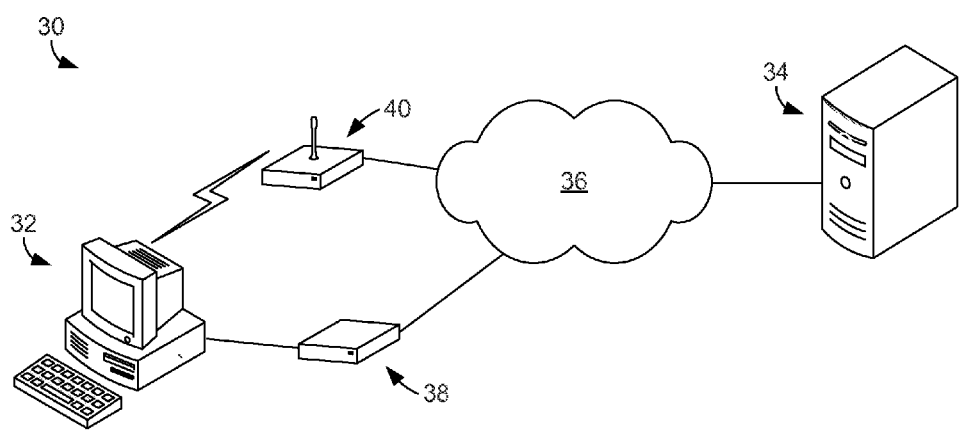
FIG. 2 is a block diagram of an embodiment of a communication system in which a communication channel can be automatically selected for file download.

FIG. 2 illustrates an example communication system 30 over which DCSL can be performed. In the example of FIG. 2, the system 30 includes a user computer 32 that can communicate with a source computer 34 via a network 36, which can comprise the Internet. Although the user computer 32 is shown as a desktop computer, the user computer can comprise substantially any computing device that is able to send and receive data over the network 36. In other embodiments, the user computer 32 can comprise a notebook computer, a tablet computer, a smart phone, or the like. The source computer 34 stores data, in the form of a data block or file, that is to be downloaded by the user computer 32. In some embodiments, the source computer 34 comprises a data server.

As is depicted in FIG. 2, the user computer 32 is connected to the network 36 with two different communications means, including a wired router 38 and a wireless router 40. The connections to these routers 38, 40 form two separate local communication channels over which data can be transmitted. Both channels support standard communications protocols implemented within two disparate interfaces in the user computer 32. In some embodiments, the wireless channel is low-speed Wi-Fi and the wired channel is high-speed Ethernet. The high-speed channel can be power managed. For example, the high-speed channel can support the Energy Efficient Ethernet (EEE) standard IEEE 802.3az to achieve maximum energy efficiency. Although Wi-Fi and Ethernet channels have been explicitly identified, it is noted that alternative local channels and alternative communication protocols could be available to the user computer 32, whether they be wired or wireless. For example, one or more of the local communication channels could be cellular or BlueTooth channels. Moreover, it is noted that the user computer 32 could have greater than two local communication channels over which it can send and receive data.

A potential bottleneck in the system 30 could be the low-speed Wi-Fi channel or could be a bottleneck "upstream" of the local channels, in which case the bottleneck is in the network 36 or is the source computer 34. For example, if the source computer 34 is unable to deliver data at a rate faster than the available bandwidth of the local low-speed channel, then there would be no benefit in using the high-speed channel. In other words, file transfer time would be the same for the low-speed and high-speed channel. A test procedure is therefore needed to identify where the bottleneck lies so that the appropriate local channel can be selected.

Figure 3:
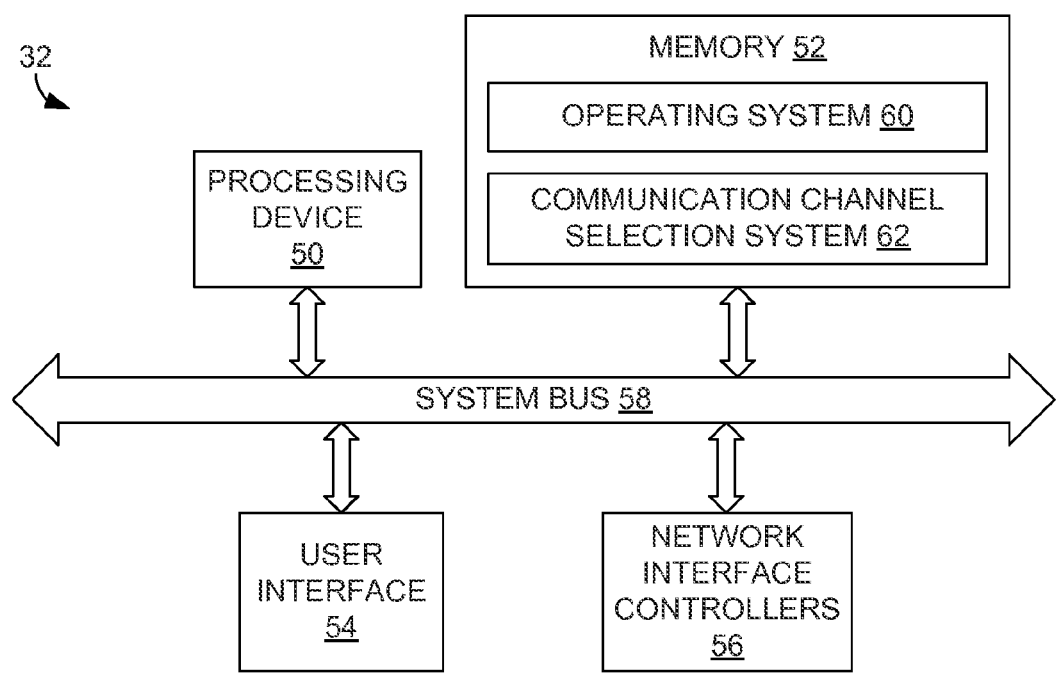
FIG. 3 is a block diagram of an embodiment of a user computer shown in FIG. 2.

FIG. 3 is a block diagram of an example architecture for the user computer 32 shown in FIG. 2. As is shown in FIG. 3, the user computer 32 generally comprises a processing device 50, memory 52, a user interface 54, and network interface controllers 56, each of which is connected to a system bus 58.

The processing device 50 can comprise a central computing processor (CPU) that is capable of executing instructions stored within the memory 52. The memory 52 is a non-transitory computer-readable medium that can include any one or a combination of volatile memory elements (e.g., random access memory (RAM)) and nonvolatile memory elements (e.g., hard disk, flash memory, etc.). The user interface 54 comprises the components with which a user interacts with the user computer 32, and the network interface controllers 56 comprise the components adapted to facilitate communications between the user computer and other devices, such as the routers 38, 40.

Stored within memory 52 are various programs and/or algorithms (logic), including an operating system 60 and a communication channel selection system 62. The channel selection system 62 is configured to automatically select the optimal communication channel in accordance with DCSL. Examples of operation of the communication channel selection system 62 are described below with respect to FIGS. 4 and 5.

Figure 4:
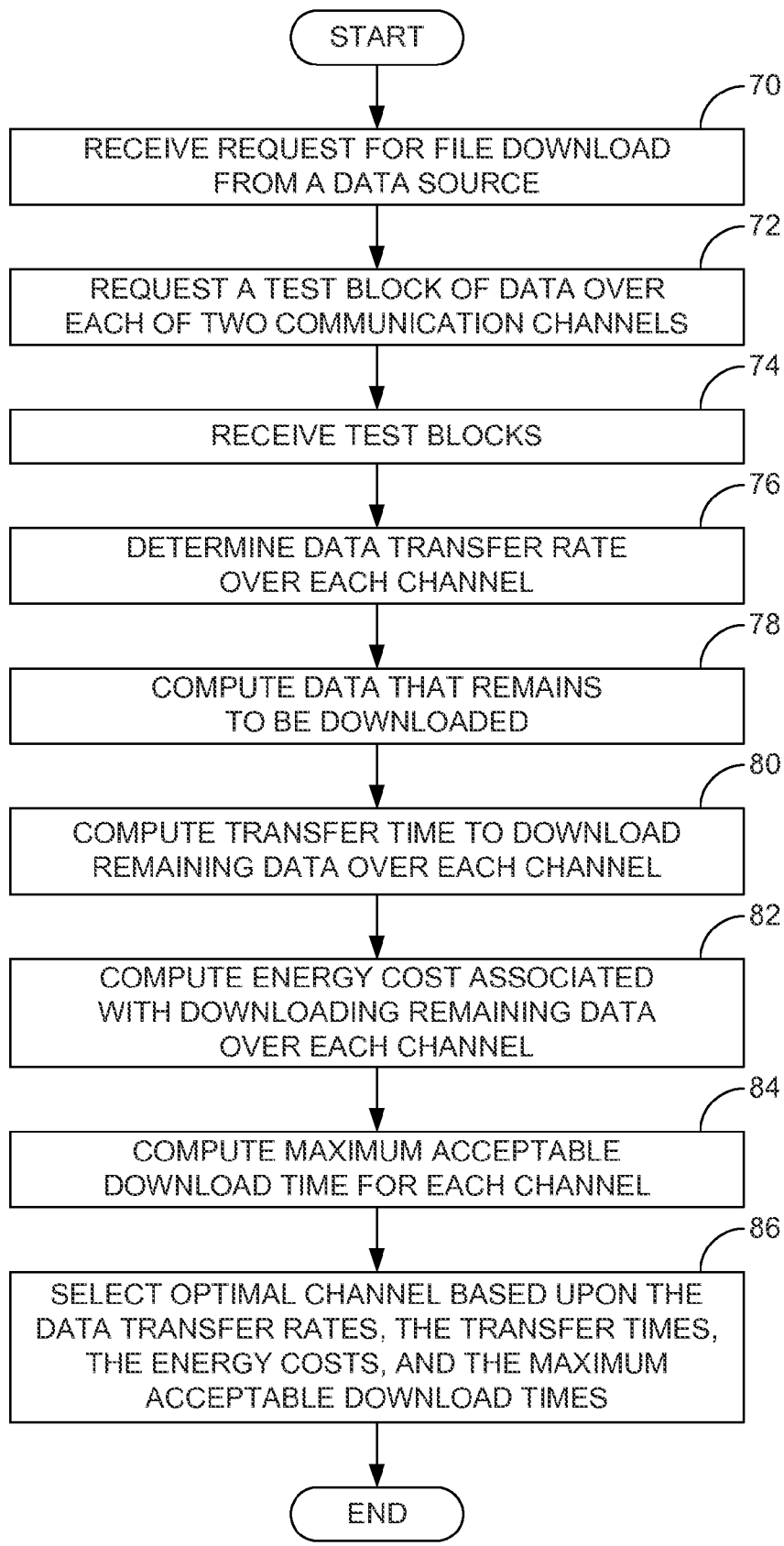
FIG. 4 is a flow diagram of a first embodiment of a method for automatically selecting a communication channel.

FIG. 4 is a flow diagram of an overview of a method for automatically selecting one of two communication channels, which can be performed by the communication channel selection system 62 of FIG. 3. In this example method, one of the channels is assumed to be a lower speed channel and the other is assumed to be a higher speed channel. The implementation can be based on the use of the hypertext transfer protocol (HTTP) for the download of files.

Beginning with block 70 of FIG. 4, a user request for a file download from a data source is received. Once the user request has been received, a test block of data is separately requested from the data source on each of two different communication channels, as indicated in block 72. The test blocks can be different, small portions of the file that is to be downloaded. Irrespective of the particular size of the test blocks, the same size block is requested on each channel.

With reference to block 74, the test blocks are received and, as indicated in block 76, the data transfer rate over each channel is determined. In addition, the amount of data that remains to be downloaded is computed, as indicated in block 78. Once the data transfer rates and the amount of data that remains to be downloaded have been determined, the transfer time required to download the remainder of the file's data over each channel can be computed, as indicated in block 80. Assuming that the power draws of the two communication channels are known, the energy cost associated with downloading the remaining data over each channel can also be computed, as indicated in block 82.

In addition to the above-described parameters, a maximum acceptable download time can be computed, as indicated in block 84. The maximum acceptable download time can be computed in a variety of ways. In essence, however, this time represents the longest amount of time that the user is willing to delay download of the file in an effort to reduce energy consumption. If the download would require greater than the maximum acceptable download time, the user would chose another higher-speed channel even if it were to mean greater power consumption.

At this point, the optimal channel for downloading the remaining data of the file is selected based upon the parameters that were determined and calculated above (block 86). Specifically, the optimal channel is selected based upon the data transfer rate, transfer time remaining, energy cost and maximum acceptable download time for each communication channel. A detailed example of the manner in which this selection is made is described in relation to FIGS. 5A and 5B below. In some embodiments, however, the channel that is selected is the channel that has the faster data transfer rate if either the energy cost on that channel is less than the energy cost on the other channel or the transfer time on the other channel is greater than the maximum acceptable download time. In cases in which the data transfer rate is exactly or substantially the same on both channels, for example, when there is a bottleneck in the network or at the data source, the channel that is selected is that having the lowest energy cost. In such a case, the higher speed, higher cost channel will not be selected because it would not complete the download any faster than the lower speed, lower cost channel would.

Figure 5A:
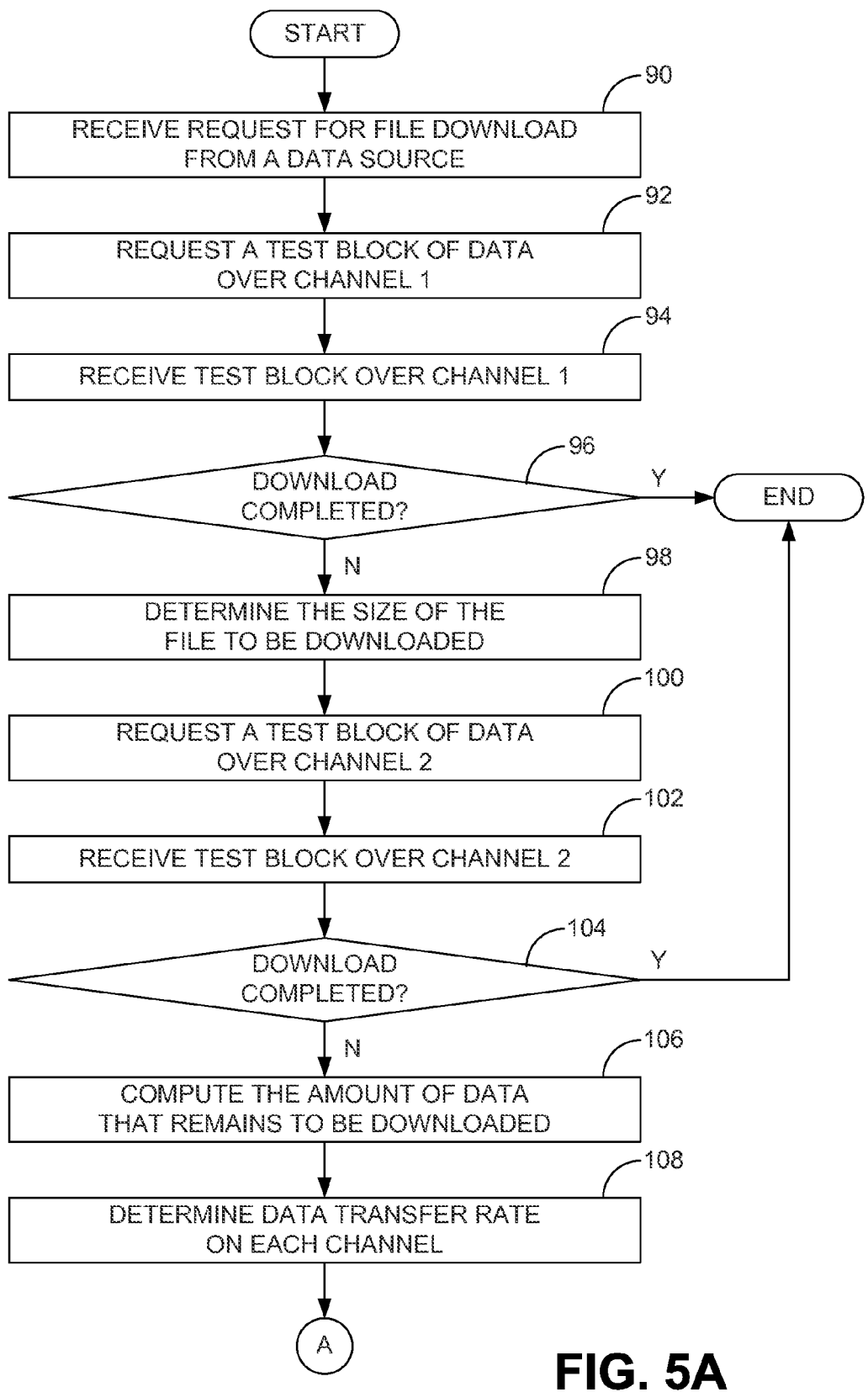
FIGS. 5A and 5B together form a flow diagram of a second embodiment of a method for automatically selecting a communication channel.
Figure 5B:
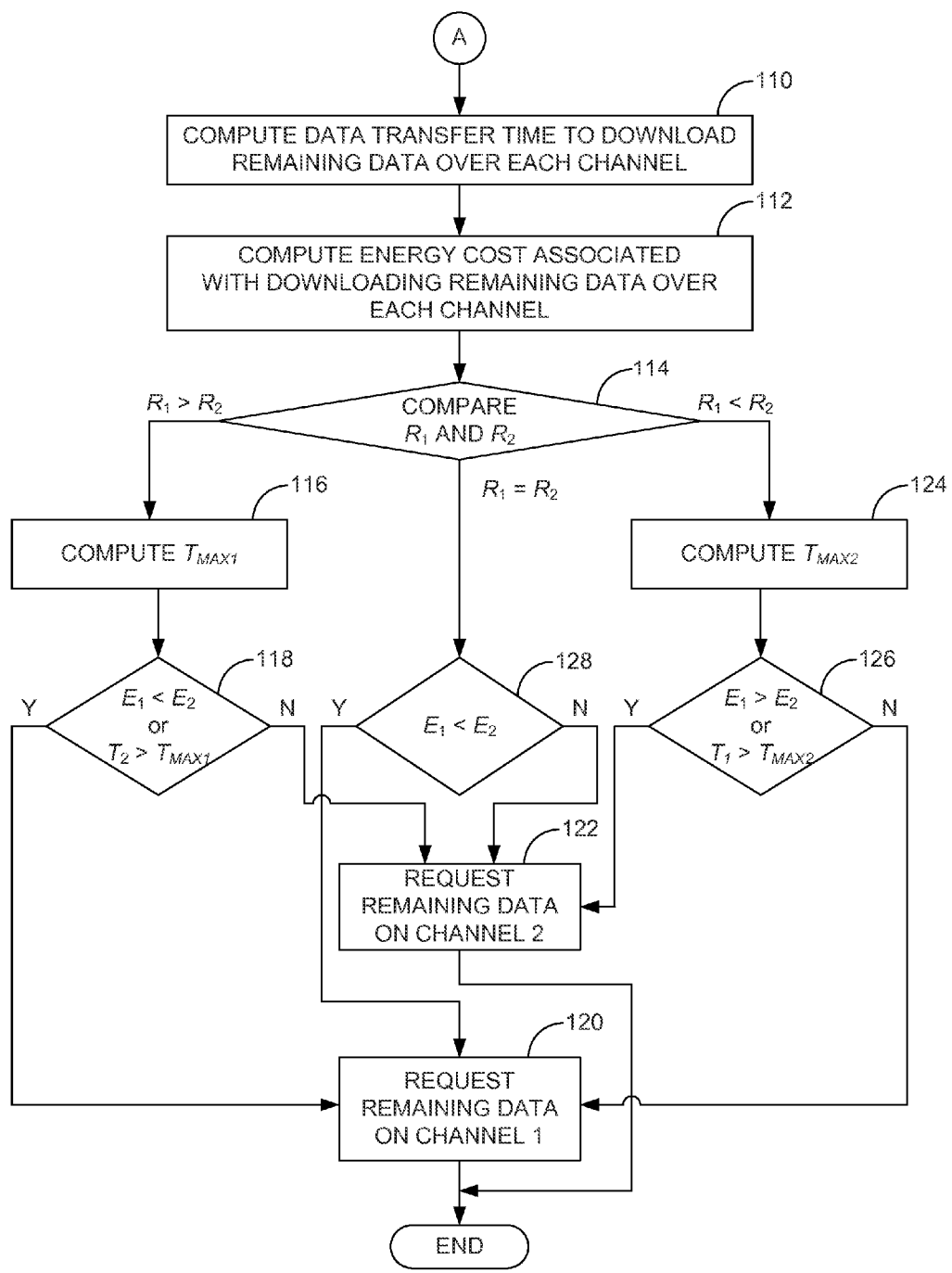

FIGS. 5A and 5B comprise a flow diagram of a detailed example of a method for automatically selecting one of two communication channels, Channel 1 and Channel 2, one of which is a relatively low-speed channel and the other of which is a relatively high-speed channel. The power consumption of each channel, $P_1$ and $P_2$, is known a priori. Nominally, a low-speed channel will have lower power consumption than a high-speed channel. In the case in which Channel 1 is the transfer rate bottleneck (and the network and/or the data source is not the bottleneck) then utilizing Channel 2 will result in a lower response time for a file transfer. However, it is not obvious where a bottleneck may be and a test phase is needed to identify the bottleneck, which may be a link in the network or the data source itself. It is important to note that if the bottleneck is in the network or the data source, then using the high-speed channel to transfer the data block will result in the same performance as using the low-speed channel, but at higher energy cost than using the low-speed channel.

Beginning with block 90 of FIG. 5A, a user request to download a file from a data source is received. For purposes of this discussion, the file is assumed to have a size S. As shown in block 92, a test block of data is then requested over Channel 1. By way of example, an HTTP GET is performed with an initial request for $S_{test}$ bytes of the file, where $S_{test}$ is the size of the test block. As described above, the test block can be a relatively small amount of data. $S_{test}$ can be selected to be just large enough to enable a reasonably accurate estimate of the data transfer rate over the channel. By way of example, the test block is approximately 1,000 to 5,000 bytes of the file data. As indicated in block 94, the data is then received over the channel. With reference next to decision block 96, flow from this point depends upon whether or not the file transfer is completed. If so, no further action is necessary and flow for the download session is terminated. If there is further data to download, however, flow continues to block 98 at which the size of the file to be downloaded is determined. In some embodiments, this determination can be made by reading this information from the HTTP response header.

Next, with reference to block 100, a test block of data of the same size as that requested over Channel 1 is requested over Channel 2, for example, using a further HTTP GET, and the test block is received over Channel 2, as indicated in block 102. With reference to decision block 104, flow from this point again depends upon whether or not the file transfer is completed. If so, the file size was less than twice the size of $S_{test}$ and no further action is necessary. If there is further data to download, however, flow continues to block 106 and the amount of data that remains to be downloaded, $S_{rem}$, is computed. $S_{rem}$ can be calculated using the following equation:

$$S_{rem} = S - 2S_{test} \quad \text{Equation 1}$$

At this point, the data transfer rates on Channels 1 and 2, $R_1$ and $R_2$, are determined, as indicated in block 108. $R_1$ can be determined by dividing $S_{test}$ bytes by the elapsed time of transferring the test block over Channel 1, and $R_2$ can be determined by dividing the $S_{test}$ bytes by the elapsed time of transferring the test block over Channel 2.

With reference next to block 110 of FIG. 5B, once the amount of data that remains to be downloaded and the data transfer rates are known, the transfer times over each channel, $T_1$ and $T_2$, can be computed using the following relations:

$$T_1 = S_{rem}/R_1 \quad \text{Equation 2}$$

$$T_2 = S_{rem}/R_2 \quad \text{Equation 3}$$

Referring to block 112, once the transfer times are known, the energy costs associated with downloading the remaining data over each channel, $E_1$ and $E_2$, can be computed using the following relations:

$$E_1 = P_1 T_1 \quad \text{Equation 4}$$

$$E_2 = P_2 T_2 \quad \text{Equation 5}$$

At this point in the process, a decision as to the location of the bottleneck in the system can be made. This decision is made by comparing the data transfer rates on the two channels, $R_1$ and $R_2$, as indicated in decision block 114. There are three situations that can occur. First, $R_1$ can be greater than $R_2$. Second, $R_2$ can be greater than $R_1$. Third, $R_1$ can equal $R_2$. Each case is described below.

Assuming that $R_1$ is greater than $R_2$, Channel 2 is the bottleneck and flow continues to block 116 at which the maximum acceptable download time, $T_{max1}$, is computed. $T_{max1}$ can be computed in various ways. In some embodiments, $T_{max1}$ can be computed using the following relation:

$$T_{max1} = (1+D)T_1 \quad \text{Equation 6}$$

where D is the maximum percentage increase over $T_1$ the user is willing to wait for the download to complete at the gain of less energy consumption. For example, if D is 10% then the maximum acceptable download time, $T_{max1}$, will be 110% of the time of the expected transfer time on Channel 1. It is noted that D is a tunable parameter that can be set per user, per data session, per application type, and so on.

Referring next to decision block 118, a decision as to which local channel to use to complete the file transfer is made in relation to the energy cost on each channel and the transfer time relative to the maximum acceptable download time. Specifically, if (i) the energy cost on Channel 1, $E_1$, is less than the energy cost on Channel 2, $E_2$, or (ii) the transfer time over Channel 2, $T_2$, is greater than the maximum acceptable download time, $T_{max1}$, then flow continues to block 120 and the remaining data is requested on Channel 1. Alternatively, if $E_1$ is greater than $E_2$ and $T_2$ is less than $T_{max1}$, then flow continues to block 122 and the remaining data is requested on Channel 2.

If, on the other hand, $R_1$ is less than $R_2$, Channel 1 is the bottleneck and flow continues from decision block 114 to block 124 at which the maximum acceptable download time, $T_{max2}$, can be computed using the following relation:

$$T_{max2} = (1+D)T_2 \quad \text{Equation 7}$$

where D is the maximum percentage increase over $T_2$ the user is willing to wait for his or her request to complete at the gain of less energy consumption. Referring next to decision block 126, a decision as to which local channel to use to complete the file transfer is made in relation to the energy cost on each channel and the transfer time relative to the maximum acceptable download time. Specifically, if (i) the energy cost on Channel 1, $E_1$, is greater than the energy cost on Channel 2, $E_2$, or (ii) the transfer time over Channel 1, $T_1$, is greater than the maximum acceptable download time, $T_{max2}$, then flow continues to block 122 and the remaining data is requested on Channel 2. However, if $E_1$ is less than $E_2$ and $T_1$ is less than $T_{max2}$, then flow continues to block 120 and the remaining data is requested on Channel 1.

Returning again to decision block 114, if the data transfer rates are equal, neither local channel is the bottleneck. In such a case, the bottleneck a component upstream of the local channels, such as a component on the network or the data source. Flow then continues to decision block 128 and the decision as to which channel to use to finish the download is made solely in relation to the energy cost for each local channel. Specifically, if $E_1$ is less than $E_2$, then Channel 1 is used (block 120). If $E_1$ is greater than $E_2$, however, then Channel 2 is used (block 122).

It is noted that many alternative cost metrics and performance thresholds can be used in determining which of two local channels to use. It is further noted that if one of the channels implements a power managed communications technology such as EEE, the performance effects of sleep-to-active and active-to-sleep transitions factor into the performance threshold decision. Sleep-to-active and active-to-sleep transitions add to the overall response time of a data transfer in such a way that using a lower data rate (and thus typically also lower energy cost) channel may reduce both overall energy cost and data transfer response time resulting in overall improved data communications. For example, in a case in which Channel 2 has $t_{wake}$ and $t_{sleep}$ transition time overhead, the calculation of $T_2$ can be modified to be $T_2=t_{wake}+t_{sleep}+(S/R_2)$ so as to include the overhead time of the wake and sleep transitions. It is this overhead time that will enable, for some values of S, $R_1$, and $R_2$, a low-speed channel (in this example Channel 1) to have simultaneously both lower response time ($T_1<T_2$) and lower energy cost ($E_1<E_2$).

A DCSL method of the type described above in relation to FIGS. 5A and 5B was implemented for evaluation purposes. The HTTP 1.1 protocol was selected for the implementation because it provides a Range feature that enables a client to get a block of data from a file. Using Java™, a client application made requests to a web server. In creating the GET request, the application added the HTTP Range feature to request the $S_{test}$ blocks of data as: Range: bytes=Start–End where Start and End denote the specific size of $S_{test}$ for the first two block requests and the remainder of the file as needed. The web server returned data up to the requested amount of data requested. When determining the equality of $R_{low}$ and $R_{high}$, a relative difference was used:

$$\left|\frac{R_{low}-R_{high}}{\min(R_{low},R_{high})}\right|<\varepsilon \quad \text{Equation 8}$$

where $\varepsilon$ is the acceptable relative difference a user is willing to accept for $R_{low}$ and $R_{high}$ to be considered the same (or equal). For example, less than a 10% difference would generally not be noticeable.

The performance attained by the implementation was experimentally evaluated. The DCSL method was implemented on a Windows™ desktop system using Java™. An Ubuntu™ file server running Apache™ hosted the static text files for download. Connection to the network from the server was a 1 Gb/s Ethernet link while the client system had both a 1 Gb/s Ethernet and an 802.11n 54 Mb/s wireless connection to the network.

For this system, the relevant factors were:
File size, S
Test block size, $S_{test}$
Percentage of similarity, $\varepsilon$
Percentage increase in delay in $T_{max}$, D
Available bandwidth of the low- and high-speed channels
The response variables were:
File download time, $T_{download}$
File download energy cost, $E_{download}$ Two experiments were defined to evaluate the effects of file size and determine bottleneck location. Small files should be transferred entirely on the low-speed channel and large files on the high-speed channel. If the bottleneck is the low-speed channel then the high-speed channel should be used to transfer a large file. If the server or connectivity to the server is the bottleneck, however, then the low-speed channel should be used since there is no benefit to using the high-speed channel in such a case.

Local Bottleneck Experiment:

The value of $S_{test}$ was set to 125 KB. The bandwidth of the low-speed Wi-Fi was 54 Mb/s and the high-speed Ethernet channel was 1 Gb/s. The file size was varied between 100 KB to 10 MB by factors of 10, and 16 KB to 256 KB by factors of 2. E was set to 0.1 and D was set to 1.0. Given full link capabilities, the client should always select the high-speed channel on large file transfers.

Upstream Bottleneck Experiment:

This experiment was the same as the previously-described experiment but after the server link was reduced from 1 Gb/s to 10 Mb/s at half duplex. This was done to diminish server capability causing the server link to have a lower data rate than either client channels. Reducing the data rate to the point where both client channel rates are similar causes the client's high-speed channel to consume more power. Because that makes it a less efficient option, the lower speed channel is employed.

Figure 6:
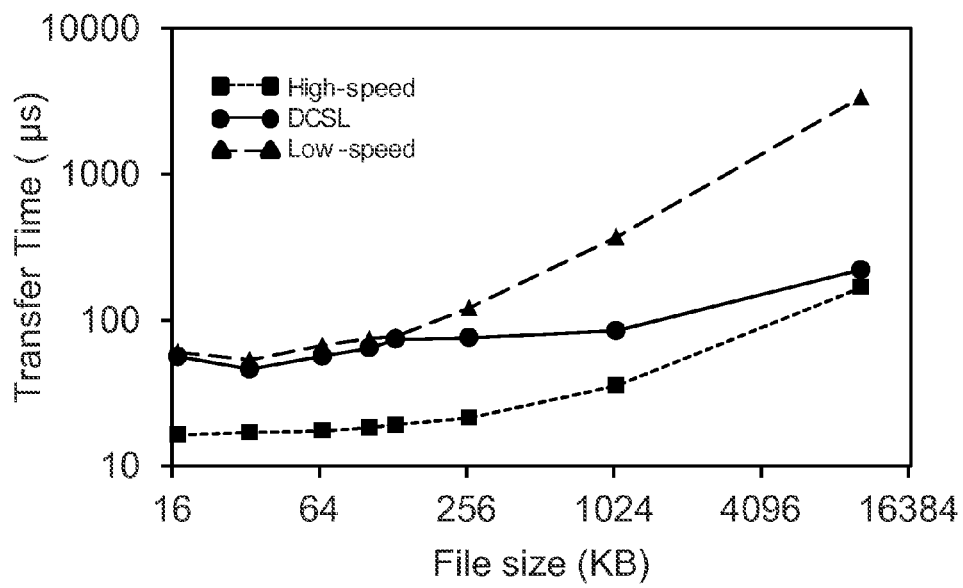
FIG. 6 is a graph that plots file download time observed for a local bottleneck.
Figure 7:
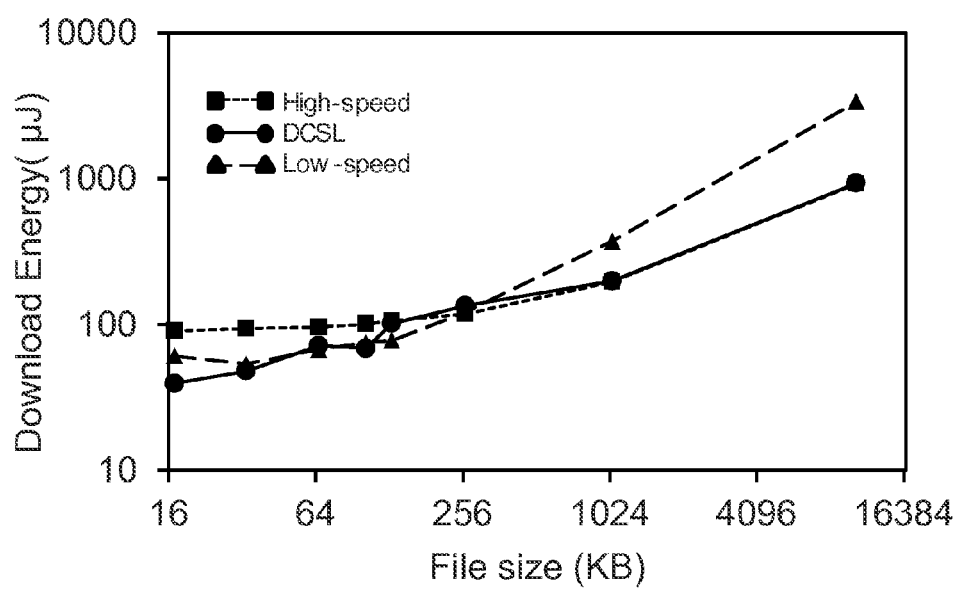
FIG. 7 is a graph that plots file download energy cost observed for a local bottleneck.
Figure 8:
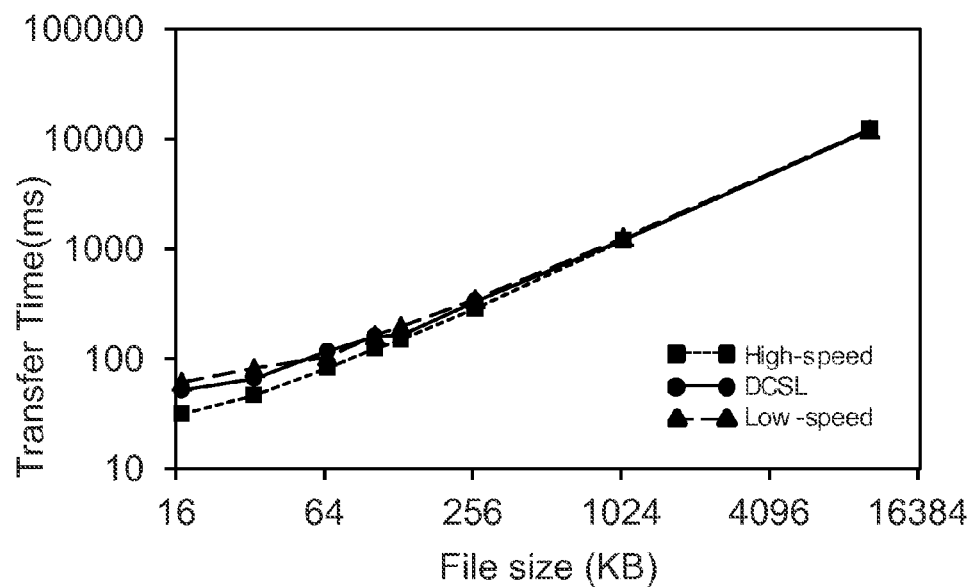
FIG. 8 is a graph that plots file download time observed for an upstream bottleneck.
Figure 9:
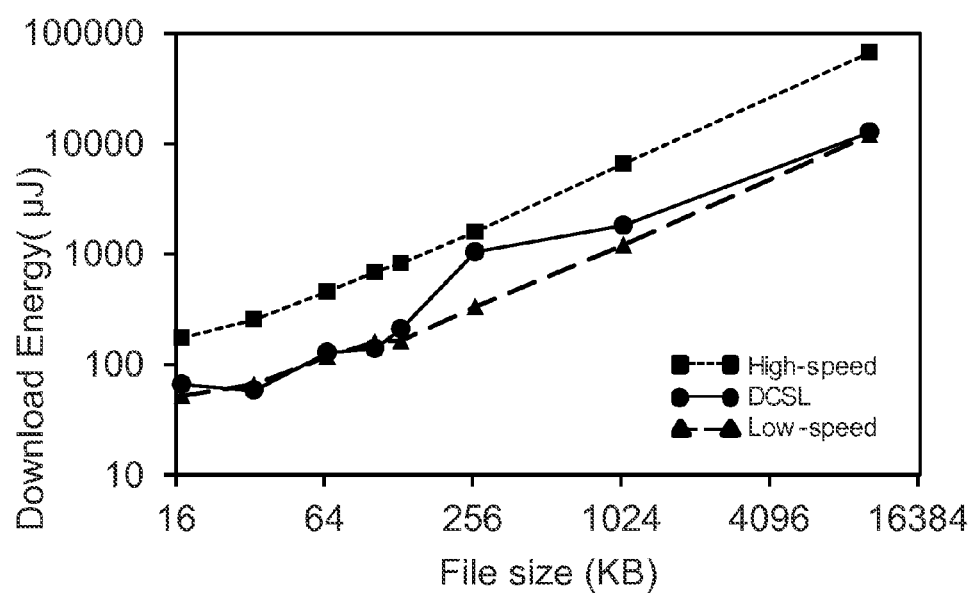
FIG. 9 is a graph that plots file download energy cost observed for an upstream bottleneck.

Using low-speed only and high-speed only experiments, the upper and lower bounds that DCSL falls within can be set. FIGS. 6 and 7 represent the local bottleneck experiments where with small files the low-speed channel was used because the performance was high enough and energy was lowest, while larger files selected the high-speed channel because it was more beneficial in both speed and overall lower cost in b/s. For the upstream bottleneck, FIG. 8 exhibits both low- and high-speed channels operating at a similarly reduced capacity with DCSL following suit. In FIG. 9, DCSL chose the more energy efficient low-speed channel for all files. In both cases, DCSL encapsulated the benefits of energy efficiency during small file downloads by capitalizing on the use of the low-speed channel with smaller files, but also favored energy-efficient large downloads by using the high-speed channel when there is no limitation in the upstream link, or using the low-speed channel to conserve energy when download speed is roughly the same between both channels due to a bottleneck not in the local network.

The invention claimed is:

1. A method for automatically selecting a local communication channel for downloading data from a data source via a network, the method comprising:
    downloading a first block of data from the data source using a first local communication channel;
    downloading a second block of data from the data source using a second local communication channel, the second block of data being of the same size as the first block of data;
    separately computing for both local communication channels a data transfer rate of the channel, a time required to download a remainder of data from the data source using the channel, and an energy cost associated with downloading the remainder using the channel;
    comparing the calculated data transfer rates of the two local communication channels; and
    in response to determining that the data transfer rate of the first local communication channel is greater than the data transfer rate of the second local communication channel, selecting the first local communication channel to download the remainder of data if: (i) the energy cost associated with downloading the remainder of data over the first local communication channel is less than the energy cost associated with downloading the remainder of data over the second local communication channel or (ii) the time required to download the remainder of data using the second local communication channel is greater than a maximum acceptable download time for the first local communication channel.

2. A non-transitory computer-readable medium that stores a communication channel selection program for automatically selecting a local communication channel for downloading data from a data source via a network, the program comprising:
    logic configured to request download of a first block of data from the data source using a first local communication channel;
    logic configured to request download of a second block of data from the data source using a second local communication channel, the second block of data being of the same size as the first block of data;

logic configured to separately compute for both local communication channels a data transfer rate of the channel, a time required to download a remainder of data from the data source using the channel, and an energy cost associated with downloading the remainder using the channel;

logic configured to request download of a second block of data from the data source using a second local communication channel, the second block of data being of the same size as the first block of data;

logic configured to separately compute for both local communication channels a data transfer rate of the channel, a time required to download a remainder of data from the data source using the channel, and an energy cost associated with downloading the remainder using the channel;

logic configured to compare the calculated data transfer rates of the two local communication channels; and logic configured to select one of the communication channels data from the data source, wherein if the data transfer rate of the first local communication channel is greater than the data transfer rate of the second local communication channel, the logic selects the first local communication channel to download the remainder of data if: (i) the energy cost associated with downloading the remainder of data over the first local communication channel is less than the energy cost associated with downloading the remainder of data over the second local communication channel or (ii) the time required to download the remainder of data using the second local communication channel is greater than a maximum acceptable download time for the first local communication channel.

3. The computer-readable medium of claim 2, wherein the logic configured to select the communication channel further comprises logic configured to separately compute maximum acceptable download times for the local communication channels to complete downloading the remainder of data from the data source.

4. A computing device comprising:
a processing device; and
memory that stores a communication channel selection program for automatically selecting a local communication channel for downloading data from a data source via a network, the program comprising:
logic configured to request download of a first block of data from the data source using two different a first local communication channels;
logic configured to request download of a second block of data from the data source using a second local communication channel, the second block of data being of the same size as the first block of data;
logic configured to separately compute for both local communication channels a data transfer rate of the channel, a time required to download a remainder of data from the data source using the channel, and an energy cost associated with downloading the remainder using the channel;
logic configured to request download of a second block of data from the data source using a second local communication channel, the second block of data being of the same size as the first block of data;
logic configured to separately compute for both local communication channels a data transfer rate of the channel, a time required to download a remainder of data from the data source using the channel, and an energy cost associated with downloading the remainder using the channel;
logic configured to compare the calculated data transfer rates of the two local communication channels; and
logic configured to select one of the communication channels data from the data source, wherein if the data transfer rate of the first local communication channel is greater than the data transfer rate of the second local communication channel, the logic selects the first local communication channel to download the remainder of data if: (i) the energy cost associated with downloading the remainder of data over the first local communication channel is less than the energy cost associated with downloading the remainder of data over the second local communication channel or (ii) the time required to download the remainder of data using the second local communication channel is greater than a maximum acceptable download time for the first local communication channel.

5. The computing device of claim 4, wherein the communication channel selection program further comprises:
logic configured to separately compute maximum acceptable download times for the communication channels to complete downloading the remainder of data from the data source.

6. The method of claim 1, further comprising:
in response to determining that the data transfer rate of the first local communication channel is less than the data transfer rate of the second local communication channel, selecting the second local communication channel to download the remainder of data if: (i) the energy cost associated with downloading the remainder of the data over the first local communication channel is greater than the energy cost associated with downloading the remainder of the data over the second local communication channel or (ii) the time required to download the remainder of data using the first local communication channel is greater than a maximum acceptable download time for the second local communication channel.

7. The method of claim 1, further comprising:
in response to determining that the data transfer rates of the first and second local communication channels are substantially equal, selecting the local communication channel that has the lesser energy cost associated with downloading the remainder of the data.

8. The method of claim 1, further comprising separately computing maximum acceptable download times for the local communication channels to complete downloading the remainder of data from the data source.

9. The method of claim 1, wherein the first local communication channel comprises a wireless connection having relatively low speed and power consumption and the second local communication channel comprises a wired connection having relatively high speed and power consumption.

10. The method of claim 1, wherein the data source comprises a server computer.

11. The computer-readable medium of claim 2, wherein if the data transfer rate of the first local communication channel is less than the data transfer rate of the second local communication channel, the logic configured to select selects the second local communication channel if (i) the energy cost associated with downloading the remainder of the data over the first local communication channel is greater than the energy cost associated with downloading the remainder of the data over the second local communication channel or (ii) the time required to download the remainder of data using the first local communication channel is greater than a maximum acceptable download time for the second local communication channel.

12. The computer-readable medium of claim 2, wherein if the data transfer rates of the first and second local communication channels are substantially equal, the logic configured to select selects the local communication channel that has the lesser energy cost associated with downloading the remainder of the data.

13. The computing device of claim 4, wherein if the data transfer rate of the first local communication channel is less than the data transfer rate of the second local communication channel, the logic configured to select selects the second local communication channel if (i) the energy cost associated with downloading the remainder of the data over the first local communication channel is greater than the energy cost associated with downloading the remainder of the data over the second local communication channel or (ii) the time required to download the remainder of data using the first local communication channel is greater than a maximum acceptable download time for the second local communication channel.

14. The computing device of claim 4, wherein if the data transfer rates of the first and second local communication channels are substantially equal, the logic configured to select selects the local communication channel that has the lesser energy cost associated with downloading the remainder of the data to download the remainder of data.

* * * * *